United States Patent
Riedel et al.

(10) Patent No.: US 10,270,887 B2
(45) Date of Patent: Apr. 23, 2019

(54) SERVER SYSTEM, AIRCRAFT OR SPACECRAFT AND METHOD

(71) Applicant: AIRBUS OPERATIONS GMBH, Hamburg (DE)

(72) Inventors: Christian Riedel, Bliedersdorf (DE); Peter Klose, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 151 days.

(21) Appl. No.: 13/724,491

(22) Filed: Dec. 21, 2012

(65) Prior Publication Data

US 2013/0198263 A1 Aug. 1, 2013

Related U.S. Application Data

(60) Provisional application No. 61/582,635, filed on Jan. 3, 2012.

(30) Foreign Application Priority Data

Jan. 3, 2012 (DE) .................. 10 2012 200 042

(51) Int. Cl.
  *H04L 29/08* (2006.01)
  *H04L 29/06* (2006.01)
  *H04L 12/40* (2006.01)
(52) U.S. Cl.
  CPC .......... *H04L 67/42* (2013.01); *H04L 67/14* (2013.01); *H04L 2012/4028* (2013.01)
(58) Field of Classification Search
  CPC .. H04L 67/42; H04L 67/14; H04L 2012/4028
  See application file for complete search history.

(56) References Cited

U.S. PATENT DOCUMENTS

| 6,976,112 B2 | 12/2005 | Franke et al. |
| 7,046,668 B2 | 5/2006 | Pettey et al. |

(Continued)

FOREIGN PATENT DOCUMENTS

| EP | 1 444 586 | 1/2011 |
| EP | 2 613 498 B1 | 7/2018 |
| WO | WO 03042797 | 5/2003 |

OTHER PUBLICATIONS

German Office Action for Application No. 10 2012 200 042.9 dated Sep. 11, 2012.

(Continued)

*Primary Examiner* — Philip J Chea
*Assistant Examiner* — Wuji Chen
(74) *Attorney, Agent, or Firm* — Jenkins, Wilson, Taylor & Hunt, P.A.

(57) ABSTRACT

The present invention provides a server system, in particular for an aircraft or spacecraft, comprising an integration device which has at least two server modules which have in each case at least one program-controlled arithmetic-logic means, at least one memory which is coupled with the program-controlled arithmetic-logic means, and at least one communication interface which is coupled with the program-controlled arithmetic-logic means, comprising at least one data line which interconnects the two server modules for data communication by the communication interfaces thereof, and comprising a server interface which is configured to connect the integration device to a data network for data communication by the communication interfaces of the server modules, the integration device being configured to exchange data with the data network. The present invention also provides an aircraft or spacecraft and a method.

10 Claims, 2 Drawing Sheets

(56) References Cited

U.S. PATENT DOCUMENTS

| | | | |
|---|---|---|---|
| 7,047,112 B2 | 5/2006 | Riedel et al. | |
| 7,362,699 B1* | 4/2008 | Bernas | H04H 20/62 |
| | | | 348/E7.086 |
| 7,890,677 B2 | 2/2011 | Chandrasekhar | |
| 7,990,847 B1 | 8/2011 | James et al. | |
| 2001/0012986 A1* | 8/2001 | Conan | G06F 11/3688 |
| | | | 702/188 |
| 2002/0103907 A1* | 8/2002 | Petersen | G06F 11/1464 |
| | | | 709/226 |
| 2002/0138618 A1 | 9/2002 | Szabo | |
| 2003/0093798 A1 | 5/2003 | Rogerson | |
| 2003/0110237 A1* | 6/2003 | Kitamura | G06F 17/30067 |
| | | | 709/219 |
| 2003/0110445 A1* | 6/2003 | Khaleque | G06F 9/4443 |
| | | | 715/222 |
| 2003/0120742 A1* | 6/2003 | Ohgami | H04H 20/63 |
| | | | 709/217 |
| 2003/0217363 A1* | 11/2003 | Brady, Jr. | H04L 29/06 |
| | | | 725/76 |
| 2004/0019668 A1* | 1/2004 | Kakadia | H04L 41/046 |
| | | | 709/223 |
| 2004/0199568 A1* | 10/2004 | Lund | H04L 69/40 |
| | | | 709/201 |
| 2004/0268358 A1* | 12/2004 | Darling | H04L 29/06 |
| | | | 718/105 |
| 2005/0047098 A1 | 3/2005 | Garnett | |
| 2005/0273823 A1* | 12/2005 | Brady, Jr. | H04L 29/12254 |
| | | | 725/76 |
| 2006/0031748 A1* | 2/2006 | Brady, Jr. | H04H 20/62 |
| | | | 715/201 |
| 2006/0179457 A1* | 8/2006 | Brady, Jr. | A63F 13/12 |
| | | | 725/76 |
| 2006/0218326 A1* | 9/2006 | Tanaka | H05K 7/1459 |
| | | | 710/104 |
| 2007/0244987 A1* | 10/2007 | Pedersen | H04L 63/0272 |
| | | | 709/217 |
| 2007/0248086 A1* | 10/2007 | Petersen | H04L 49/15 |
| | | | 370/389 |
| 2008/0166131 A1* | 7/2008 | Hudgins | H04B 10/40 |
| | | | 398/117 |
| 2009/0187662 A1* | 7/2009 | Manapragada | H04L 67/1008 |
| | | | 709/226 |
| 2009/0201927 A1* | 8/2009 | Lund | H04L 69/40 |
| | | | 370/389 |
| 2009/0234972 A1* | 9/2009 | Raghu | H04L 67/2804 |
| | | | 709/246 |
| 2009/0288104 A1* | 11/2009 | Bagepalli | H04L 63/10 |
| | | | 719/328 |
| 2010/0132009 A1* | 5/2010 | Khemani | G06F 9/468 |
| | | | 726/1 |
| 2011/0029899 A1* | 2/2011 | Fainberg | G06F 17/30902 |
| | | | 715/760 |
| 2011/0145590 A1* | 6/2011 | Harada | G06Q 20/206 |
| | | | 713/185 |
| 2011/0276199 A1 | 11/2011 | Brot | |
| 2012/0163180 A1* | 6/2012 | Goel | H04L 45/30 |
| | | | 370/238 |
| 2012/0297291 A1* | 11/2012 | Fainberg | G06F 17/30902 |
| | | | 715/234 |
| 2014/0280509 A1* | 9/2014 | Merrells | H04L 67/42 |
| | | | 709/203 |
| 2014/0304294 A1* | 10/2014 | Sharma | G06F 17/30132 |
| | | | 707/769 |

OTHER PUBLICATIONS

European Office Action for Application No. 12198028 dated Aug. 19, 2016.
European Office Action for European Application No. 12198028.8 dated Aug. 19, 2016.
European Office Action for European Application No. 12198028.8 dated Aug. 10, 2017.
Extended European Search Report for Application No. 12198028.8 dated Apr. 24, 2013.

* cited by examiner

SERVER SYSTEM, AIRCRAFT OR SPACECRAFT AND METHOD

CROSS-REFERENCE TO RELATED APPLICATIONS

This application claims the benefit of and priority to U.S. Provisional Application No. 61/582,635, filed Jan. 3, 2012 and German Patent Application No. 10 2012 200 042.9 filed Jan. 3, 2012, the entire disclosures of which are herein incorporated by reference.

FIELD OF THE INVENTION

The present invention relates to a server system, in particular for an aircraft or spacecraft, to an aircraft or spacecraft and to a method.

BACKGROUND OF THE INVENTION

Although the present invention and the problem it addresses can be applied to any servers, they will be described in detail with regard to in-flight entertainment (IFE) servers for aircraft.

In modern aircraft, an appropriate entertainment programme is offered to the passengers, depending on the type and duration of the flight. For example, in this respect, on short-haul flights, the same film can be shown to all the passengers on monitors which are fitted above the passengers' heads under the lockers or on the ceiling or on the walls of the aircraft.

Usually, the longer the flight, the wider the range of entertainment provided in the aircraft. Thus, for example, the seats of an intercontinental flight aircraft can have a monitor in the headrest. As a result, it is possible for every passenger to have his/her own display. Likewise, connection facilities for passengers' headphones can be provided at each seat. Consequently, every passenger can individually receive a radio programme or, for example, the sound to a film.

In order to be able to offer entertainment programmes of this type in an aircraft, at present so-called IFE servers are usually used which provide the audio and video material. These servers are usually fitted in an installation site, specifically provided for IFE servers of this type, in an aircraft.

Therefore, this installation site is reserved in every aircraft for an IFE server. This site is also reserved even if an IFE server is not provided, or if only a relatively small IFE server is provided in the aircraft. Consequently, the installation space in aircraft, which in any case is very limited, is restricted further and maintaining an installation site for an IFE server including the mechanical attachment means and the cabling increases the weight of the aircraft and the complexity of the cable harness of the aircraft.

This is a situation which should be avoided.

EP 1 444 586 B1 indicates a possibility of installing a second host computer in addition to a first host computer which is already present, in an electronic system of an aircraft. As a result, it is possible for example to integrate an IFE server into an existing electronic system of an aircraft. It is therefore unnecessary to reserve the installation site for an IFE server. However, this solution is not very flexible, because only a low-power IFE server can be arranged in the electronic system in the restricted installation space.

SUMMARY OF THE INVENTION

It is therefore the object of the present invention to provide a server which can be adapted in a flexible manner.

This object is achieved according to the invention by a server system, by an aircraft or spacecraft and by a method having the features disclosed herein.

According thereto, there is provided:

A server system, in particular for an aircraft or spacecraft, comprising an integration device which has at least two server modules which have in each case at least one program-controlled arithmetic-logic means, at least one memory which is coupled with the program-controlled arithmetic-logic means, and at least one communication interface which is coupled with the program-controlled arithmetic-logic means, comprising at least one data line which interconnects the two server modules for data communication by the communication interfaces thereof, and comprising a server interface which is configured to connect the integration device to a data network for data communication by the communication interfaces of the server modules, the integration device being configured to exchange data with the data network.

An aircraft or spacecraft, in particular an aircraft, having a data network which comprises electronic systems, and having a server system according to any one of the preceding claims, the server system being coupled with the data network.

A method for operating a data network, particularly in an aircraft or spacecraft, comprising the steps of coupling by a data line in an integration device at least two server modules which have in each case at least one program-controlled arithmetic-logic means, at least one memory which is coupled with the program-controlled arithmetic-logic means, and at least one communication interface which is coupled with the program-controlled arithmetic-logic means, coupling the integration device to a data network for data communication via the communication interfaces of the server modules, exchanging data between the integration device and the data network.

The fundamental understanding of the present invention is that an individual server which executes comprehensive server tasks demands a large installation space, or a server of a relatively small overall size has only a low computing power, as a result of which data processing in the server becomes very slow.

The fundamental idea of the present invention is now to take this understanding into account and to provide a server system, in which a plurality of server modules cooperates in order to jointly provide a combined, high computing power, each server system being arranged in a small installation space. This affords the advantage that an increased installation space does not have to be maintained for a single server in an aircraft.

The present invention makes it possible to provide the functionality of a server, for example of an IFE server by means of a plurality of server modules. In this respect, the individual server modules form a virtual server which is implemented, distributed over a plurality of server modules.

Electronic systems which want to communicate with the server can address the server centrally via the server interface. Therefore, for these electronic systems, the server system appears as a single conventional server. This affords the advantage that the electronic systems which communicate with the server do not have to be adapted to a new server architecture or even to a plurality of individual servers.

This allows a rapid and cost-effective use of a server system according to the invention in an aircraft, for example.

The present invention also affords the advantage that the computing capacity and the memory capacity of the server system can be adapted to different requirements in a very flexible manner. Thus, for simple IFE systems, for example only two server modules are coupled in a server system.

If complex and memory-intensive or computing-intensive applications are performed on the server, then, depending on requirements, further server modules can be added to the server system and both the computing capacity as well as the memory capacity of the server system can be adapted thereby.

Advantageous configurations and improvements of the invention are provided in the subclaims.

According to an embodiment, the server modules are arranged as additional modules in different electronic systems of the data network. This makes it possible to integrate a server system according to the invention in a space-saving manner into an existing data network.

According to an embodiment, the integration device comprises for each additional module a disconnecting device which is configured to couple the server modules with the interfaces of the respective electronic system of the data network and to disconnect the server modules functionally from the respective electronic systems of the data network. This allows the integration and operation of a server module according to the invention in an existing data network, for example without the installation of separate power lines and control lines. The server module can be operated, for example via an input interface of an electronic system, but it cannot influence the operation of the electronic system, for example of the cabin system.

According to an embodiment, the data line is configured as an internal data connection of the data network. If data lines, already present, of a data network are used for the communication between the individual server modules, a server system according to the invention can be installed in a particularly simple manner in a data network, without it being necessary to subsequently lay cables or the like.

According to an embodiment, the integration device has a forwarding means which is configured to forward the data arriving at the server system to at least one server module. If a forwarding means according to the invention is provided, incoming data can be directly transmitted to the server module which is responsible for processing the respective data.

According to an embodiment, the forwarding means is configured to forward the data arriving at the server system to the server module which has the greatest free computing capacity. This ensures that the free computing capacity of the individual server modules is used as efficiently as possible.

According to an embodiment, the forwarding means is configured to forward the data arriving at the server system to the server module which is positioned closest to the electronic system in the data network from which the request originates. This makes it possible to keep the load as low as possible in individual portions of the data network.

According to an embodiment, the forwarding means is configured to forward the data arriving at the server system to a corresponding server module, depending on the full utilisation of the individual server modules and on the distance of the electronic system, from which the data originates, to the individual server modules. This makes it possible to use free computing capacities in the server modules and at the same time to bear in mind the full utilisation of the data network.

According to an embodiment, the server system is configured as an in-flight entertainment (IFE) server system. It is thus possible to provide a flexibly adaptable IFE system in an aircraft in a very simple and economical manner.

According to an embodiment, the server system is configured as an audio/video server and/or as a video-on-demand server and/or as a web server and/or as an email server and/or as a gaming server. This makes it possible to adapt the server system flexibly to different cases of use.

According to an embodiment, the program-controlled arithmetic-logic means of the server modules comprises single-core processors, multi-core processors or processor modules with at least one processor. This makes it possible to adapt the computing power of the individual server modules individually to different requirements.

According to an embodiment, the server interface is configured as a cable-bound interface and/or as an optical data interface and/or as a wireless data interface. This makes it possible to integrate a server system according to the invention into different data networks and to select a network system which is adapted to the respective case of use.

BRIEF DESCRIPTION OF THE DRAWINGS

In the following, the invention will be described in more detail on the basis of embodiments with reference to the accompanying figures, in which.

Figure 1:
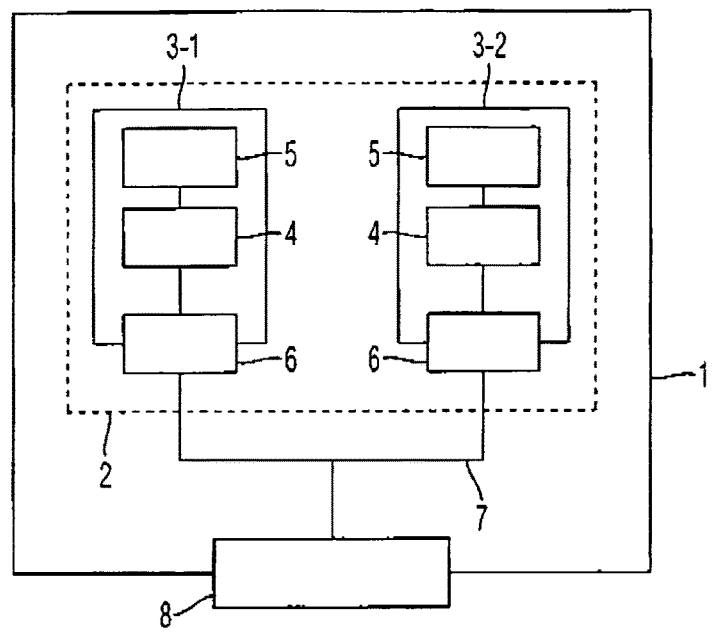
FIG. 1 is a block diagram of an embodiment of a server system according to the invention.

In the figures, identical reference signs denote identical or functionally identical components, unless indicated otherwise.

In the context of this patent application, the term "integration device 2" is understood as meaning a device which is configured to combine two server modules 3-1-3-$n$ such that these server modules cannot be identified as individual server modules 3-1-3-$n$ by an electronic system 12-1-12-$n$ which accesses the server system 1. To the electronic system 12-1-12-$n$, the server system 1 outwardly appears or appears to the user as if only a single server were present.

In an embodiment, the integration device 2 can be configured as a hardware device which monitors the communication between the server modules 3-1-3-$n$ and the electronic systems 12-1-12-$n$ and correspondingly adapts the contents of the data packets to the data lines. In particular, the integration device adapts the sender and receiver addresses of the data packets.

In a further embodiment, the integration device 2 is configured as a computer program product which is integrated on at least one of the server modules 3-1-3-$n$ and is implemented by the corresponding server module 3-1-3-$n$. Further embodiments are also possible.

Furthermore, in the context of this application, the term "server module 3-1-3-$n$" is understood as meaning a hardware module which comprises the components mentioned under the term "server module 3-1-3-$n$", program-controlled arithmetic-logic means 4, memory 5 and communication interface 6 and which performs the function of a server. In this respect, a server operating system based on, for example Windows or Linux can be installed on the server module.

In an embodiment, a server module 3-1-3-$n$ is constructed as a compact computer with its own housing.

In a further embodiment, a server module 3-1-3-*n* is constructed as a plug-in card which can be arranged in an intended slot in an electronic system 12-1-12-*n*. Further embodiments are possible.

In the context of the present patent application, the term "disconnecting device" is understood as meaning a device which is configured in hardware or as a computer program product and which can allow a server module 3-1-3-*n* to use the interfaces of an electronic system 12-1-12-*n*, without thereby influencing the operation of the electronic system 12-1-12-*n*.

In an embodiment, the disconnecting device is configured as at least one change-over switch which couples, for example a display device of the electronic system 12-1-12-*n* alternately with the electronic system 12-1-12-*n* or with a server module 3-1-3-*n*.

In a further embodiment, the disconnecting device is a computer program product which is implemented in the electronic system 12-1-12-*n* and which receives data from the server module and forwards this data via the interfaces of the electronic system 12-1-12-*n*, or vice versa. In this respect, the computer program product ensures that the operation of the electronic system 12-1-12-*n* is not affected. Further embodiments are also possible.

DETAILED DESCRIPTION OF THE INVENTION

FIG. 1 is a block diagram of an embodiment of a server system 1 according to the invention.

The server system 1 in FIG. 1 comprises an integration device 2 which has two server modules 3-1, 3-2. Each server module 3-1, 3-2 has an arithmetic-logic means 4 which is electrically coupled with a memory 5 and a communication interface 6. Furthermore, the two server modules 3-1, 3-2 are interconnected for data communication by a data line 7. Finally, the server system 1 in FIG. 1 has a server interface 8 which is coupled with the data line 7.

The server system 1 in FIG. 1 can be coupled with a data network 11 via the server interface 8 to allow the exchange of data between the server system 11 and electronic systems 12-1-12-*n* of the data network.

In an embodiment, the server interface 8 is configured as an Ethernet interface 8. In further embodiments, the server interface 8 is configured as a fibre optic interface 8, as an air interface 8 or the like.

Furthermore, in an embodiment, the communication interfaces 6 are configured as Ethernet interfaces 6. In further embodiments, the communication interfaces 6 are configured as optical interfaces 6, for example fibre optic interfaces 6, as air interfaces 6 or the like.

The data network 11 can be a data network 11 of an aircraft 10. In particular, the data network 11 can be an Ethernet network in an aircraft.

In the embodiment shown in FIG. 1, the server modules 3-1-3-*n* are configured as external server modules 3-1-3-*n*. In an embodiment of this type, each of the server modules 3-1-3-*n* has its own housing. Since the computing power of each individual server module 3-1-3-*n* is low compared to a single server, the server modules 3-1-3-*n* can be constructed in a very small installation space. Therefore, the individual server modules 3-1-3-*n* can be arranged in an aircraft in a very flexible manner.

In a further embodiment, the server modules 3-1-3-*n* are each arranged as plug-in cards in one of the electronic systems, for example of an aircraft 10. Further embodiments are also possible.

Figure 2:
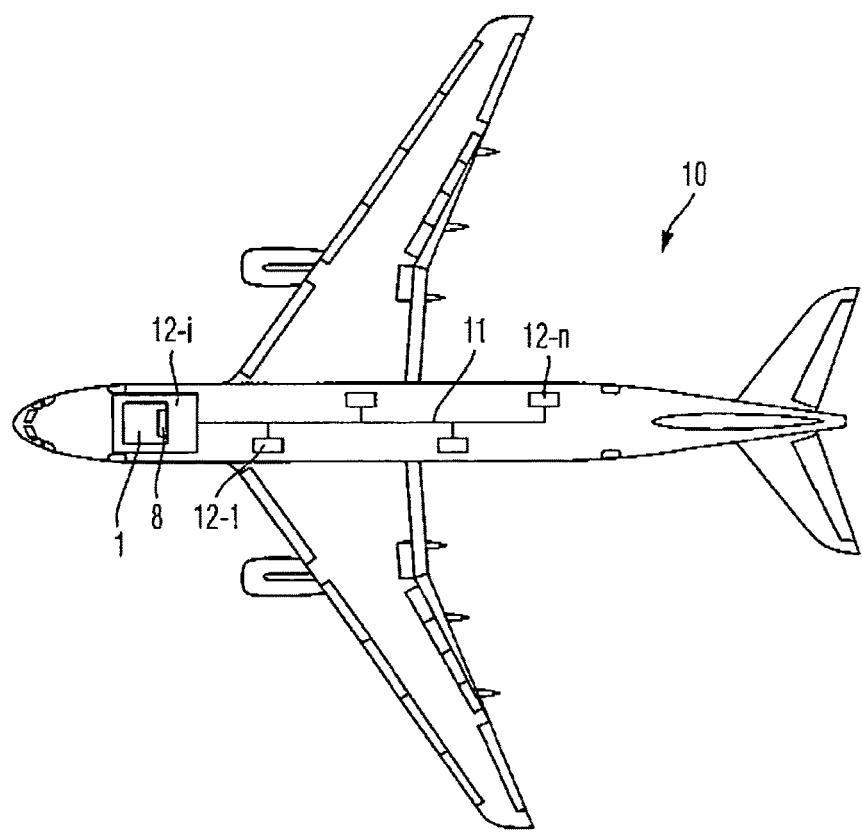
FIG. 2 is a diagram of an embodiment of an aircraft according to the invention.

FIG. 2 shows a diagram of an embodiment of an aircraft 10 according to the invention.

The aircraft 10 has a server device 1 which is arranged in an electronic system 12-*i* and is connected to a data network 10 via the server interface 8.

The data network 10 has a plurality of electronic systems 12-1-12-*n*. FIG. 2 shows by way of example four electronic systems 12-1-12-*n*. A different number of electronic systems 12-1-12-*n* can be provided in a further embodiment.

The data network 11 in FIG. 2 is configured as an Ethernet network 11. In further embodiments, the data network 11 can also be configured as a fibre optic network 11, as a wireless network 11, in particular as a WiFi network 11, or the like. In further embodiments, the data network 11 comprises a combination of an Ethernet network 11, a fibre optic network 11, a wireless network 11 and the like.

The electronic systems 12-1-12-*n* can be different electronic systems 12-1-12-*n* of an aircraft. For example, one electronic system 12-1-12-*n* can be an operating unit of an aircraft, for example a so-called flight attendant panel (FAP), a server which is already present in the aircraft 10, for example a so-called cabin intercommunication data system (CIDS) server, seat electronics, distributer electronics, a communications server, for example a so-called connectivity controller, or the like.

In an embodiment, a server module 3-1-3-*n* is arranged in a flight attendant panel (FAP) of the aircraft 10 and a further server module 3-1-3-*n* is arranged in the seat electronics of an aircraft 10.

In further embodiments, the server modules 3-1-3-*n* can be arranged in any electronic systems 12-1-12-*n* of the aircraft 10 and can use the data lines of the data network 11, which data network 11 is already present in the aircraft 10, in order to couple together the electronic systems 12-1-12-*n*.

Figure 3:
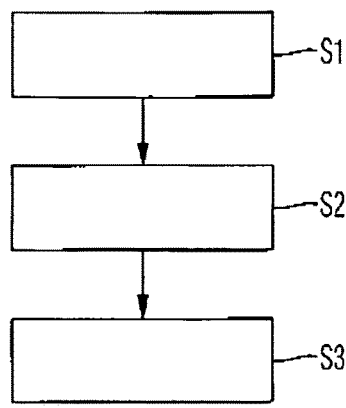
FIG. 3 is a flow chart of an embodiment of a method according to the invention.

FIG. 3 is a flow chart of an embodiment of a method according to the invention.

In the method shown in FIG. 3, in a first step S1, at least two server modules 3-1-3-*n* are coupled in an integration device 2 by a data line. In this respect, the server modules 3-1-3-*n* have in each case at least one program-controlled arithmetic-logic means 4, at least one memory 5 which is coupled with the program-controlled arithmetic-logic means 4, and at least one communication interface 6 which is coupled with the program-controlled arithmetic-logic means 4.

In a further step S2, the integration device 2 is coupled via the communication interfaces 6 of the server modules 3-1-3-*n* for data communication with one another and with a data network 11.

In a last step S3, data are exchanged between the integration device 2 and the data network 11.

Figure 4:
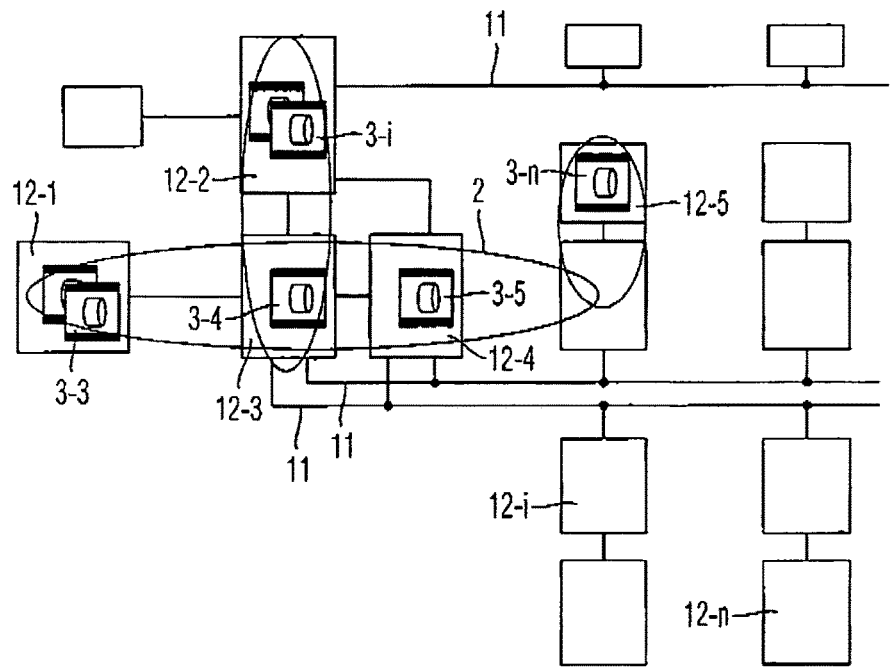
FIG. 4 is a block diagram of a data network with an embodiment of a server system according to the invention.

FIG. 4 is a block diagram of a data network 11 with an embodiment of a server system 1 according to the invention.

The data network 11 has a plurality of electronic systems 12-1-12-*n* which are connected to data lines of the data network 11. The data network 11 has in particular a so-called flight attendant panel 12-1 in which two server modules 3-3 are arranged. The data network 11 also has two CIDS servers 12-3, 12-4 in which at least one server module 3-4, 3-5 is respectively arranged. Furthermore, the data network 11 has a so-called connectivity controller, in which two server modules 3-*i* are arranged. Finally, the data network 11 has a display unit 3-*n* which, for example is a display above a row of seats and has a server module 3-*n*.

In further embodiments, a greater or smaller number of server modules 3-1-3-*n* can be arranged in the electronic systems 12-1-12-*n* of the data network 11.

In particular, the number of server modules 3-1-3-*n* can depend on the type of desired functionality of the server system 1.

If the server system 1 is to serve purely as a video server which only provides a single film for the entire cabin of the aircraft 10, only a small amount of computing power and memory is required. However, if the server system 1 is to serve as a video-on-demand server, then more computing power and also memory will be required. In an embodiment of this type, the number of server modules 3-1-3-*n* would be increased.

In a further embodiment, the server system 1 can also serve as an Internet server and/or as an email server and/or as a gaming server. In such a case, the number of server modules 3-1-3-*n* is again increased.

The present invention makes it possible to integrate a prospective use, which is not yet relevant today in aircraft for example, in the future as well, since a corresponding number of server modules are integrated in the aircraft subject to the requirements of the respective use. In an embodiment, a server module can be integrated for example in each individual seat, for instance in a display unit in the seats of an aircraft 10.

Although the present invention has been described above on the basis of preferred embodiments, it is not restricted thereto, but can be modified in many different ways.

For example, the present invention can be used for server systems in rail vehicles, particularly in trains, in boats and the like.

LIST OF REFERENCE NUMERALS 1 server system
2 integration device
3-1-3-*n* server modules
4 arithmetic-logic means
5 memory
6 communication interface
7 data line
8 server interface
10 aircraft or spacecraft
11 data network
12-1-12-*n* electronic systems
S1-S3 method steps

The invention claimed is:

1. A server system, in particular for an aircraft or spacecraft, comprising:
an integration device that facilitates communications between a virtual server and different electronic systems of an aircraft, wherein the virtual server includes server modules arranged as plug-in cards in respective slots of the electronic systems, wherein each of the server modules includes at least one program-controlled arithmetic-logic module, at least one memory which is coupled with the program-controlled arithmetic-logic module, and at least one communication interface which is coupled with the program-controlled arithmetic-logic module;
at least one data line which interconnects the server modules for data communication by the communication interfaces thereof; and
a server interface which is configured to connect the integration device to a data network for data communication by the communication interfaces of the server modules, wherein each of the electronic systems is configured to communicate with the virtual server via the server interface, wherein the integration device is configured to forward, via the data network, data arriving at the server interface to the server module which is located closest to one of the electronic systems from which a request originates, wherein the integration device monitors the communications between the server modules and the electronic systems and correspondingly adapts sender and receiver addresses of data packets; and
wherein the integration device includes for each server module a disconnecting device which is configured to couple the respective server module with power lines and control lines of the respective electronic system, to operate the respective server module with an input interface of the respective electronic system, and to disconnect the respective server module functionally from the respective electronic system, without thereby influencing operation of the respective electronic system.

2. The server system according to claim 1, wherein the data line is configured as an internal data connection of the data network.

3. The server system according to claim 1, wherein the integration device is configured to forward the data arriving at the server interface to the server module which has the greatest free computing capacity.

4. The server system according to claim 1, wherein the server system is configured as an in-flight entertainment server system.

5. The server system according to claim 1, wherein the server system is configured as an audio/video server and/or as a video-on-demand server and/or as a web server and/or as an email server and/or as a gaming server.

6. The server system according to claim 1, wherein the program-controlled arithmetic-logic module of the server modules comprises single-core processors, multi-core processors or processor modules with at least one processor.

7. The server system according to claim 1, wherein the server interface is configured as a cable-bound interface and/or as an optical data interface and/or as a wireless data interface.

8. An aircraft or spacecraft, in particular aircraft, comprising:
a data network which connects electronic systems of an aircraft; and
a server system, the server system being coupled with the data network, and the server system comprising:
an integration device that facilitates communications between a virtual server and the electronic systems, wherein the virtual server includes server modules arranged as plug-in cards in respective slots of the electronic systems, wherein each of the server modules includes at least one program-controlled arithmetic-logic module, at least one memory which is coupled with the program-controlled arithmetic-logic module, and at least one communication interface which is coupled with the program-controlled arithmetic-logic module;
at least one data line which interconnects the server modules for data communication by the communication interfaces thereof; and
a server interface which is configured to connect the integration device to the data network for data communication by the communication interfaces of the server modules, wherein each of the electronic systems is configured to communicate with the virtual server via the server interface, wherein the integration device is configured to forward, via the data network, data arriving at the server interface to the server module which is located closest to one of the electronic systems from which a request originates, wherein the integration device monitors the communications between the server modules and the electronic systems and correspondingly adapts sender and receiver addresses of data packets; and wherein the integration device includes for each server module a disconnecting device which is configured to couple the respective server module with power lines and control lines of the respective electronic system, to operate the respective server module with an input interface of the respective electronic system, and to disconnect the respective server module functionally from the respective electronic system, without thereby influencing operation of the respective electronic system.

9. A method for operating a data network, in particular in an aircraft or spacecraft, the method comprising:

coupling by a data line in an integration device server modules of a virtual server, wherein the integration device facilitates communications between the virtual server and different electronic systems of an aircraft, wherein the server modules are arranged as plug-in cards in respective slots of the electronic systems, wherein each of the server modules includes at least one program-controlled arithmetic-logic module, at least one memory which is coupled with the program-controlled arithmetic-logic module, and at least one communication interface which is coupled with the program-controlled arithmetic-logic module;

connecting, by a server interface, the integration device to a data network for data communication via the communication interfaces of the server modules, wherein each of the electronic systems is configured to communicate with the virtual server via the server interface, wherein the integration device is configured to forward, via the data network, data arriving at the server interface to the server module which is located closest to one of the electronic systems from which a request originates, wherein the integration device monitors the communications between the server modules and the electronic systems and correspondingly adapts sender and receiver addresses of data packets; and using, for each server module, a disconnecting device to couple the respective server module with power lines and control lines of the respective electronic system, to operate the respective server module with an input interface of the respective electronic system, and to disconnect the respective server module functionally from the respective electronic system of the data network, without thereby influencing operation of the respective electronic system.

10. A server system, in particular for an aircraft or spacecraft, comprising:

an integration device that facilitates communications between a virtual server and different electronic systems of an aircraft, wherein the virtual server includes server modules arranged as plug-in cards in respective slots of the electronic systems, wherein each of the server modules includes at least one program-controlled arithmetic-logic module, at least one memory which is coupled with the program-controlled arithmetic-logic module, and at least one communication interface which is coupled with the program-controlled arithmetic-logic module;

at least one data line which interconnects the server modules for data communication by the communication interfaces thereof; and a server interface which is configured to connect the integration device to a data network for data communication by the communication interfaces of the server modules, wherein each of the electronic systems is configured to communicate with the virtual server via the server interface, wherein the integration device is configured to forward, via the data network, data arriving at the server interface to the server module which is located closest to one of the electronic systems from which a request originates, wherein the integration device monitors the communications between the server modules and the electronic systems and correspondingly adapts sender and receiver addresses of data packets; and wherein the integration device includes for each server module a disconnecting device which is configured to couple the respective server module with power lines and control lines of the respective electronic system, to operate the respective server module with an input interface of the respective electronic system, and to disconnect the respective server module functionally from the respective electronic system, without thereby influencing operation of the respective electronic system, wherein the disconnecting device comprises a change-over switch which couples a display device of the respective electronic system alternately with the respective electronic system or with a respective server module.

\* \* \* \* \*